F. G. BURGESS.
EYEGLASSES AND SPECTACLES.
APPLICATION FILED FEB. 3, 1920.

1,355,535.  Patented Oct. 12, 1920.

Inventor
Frederich G. Burgess.
By James F. Duhamel,
Attorney

UNITED STATES PATENT OFFICE.

FREDERICK G. BURGESS, OF BROOKLYN, NEW YORK.

EYEGLASSES AND SPECTACLES.

1,355,535.                Specification of Letters Patent.      Patented Oct. 12, 1920.

Application filed February 3, 1920. Serial No. 355,905.

*To all whom it may concern:*

Be it known that I, FREDERICK G. BURGESS, a citizen of the United States, residing at Brooklyn, Kings county, and New York State, have invented certain new and useful Improvements in Eyeglasses and Spectacles, of which the following is a specification.

This invention relates to eye glass and spectacle frames and particularly to that class of "glasses" which are provided with circular lenses that are very liable to turn in the eye wires of the frames and move about or revolve therein, and the object of the invention is to afford a means to retain the lens against movement and consisting of a notch in the edge of the glass and an indent or malformation in the frame to correspond with and fit in the notch to prevent any change of relation between the said lens and frame.

These and other objects and details of the invention are more fully described in the following specification, set forth in the appended claims and illustrated in the accompanying drawings, wherein:

Figure 1:
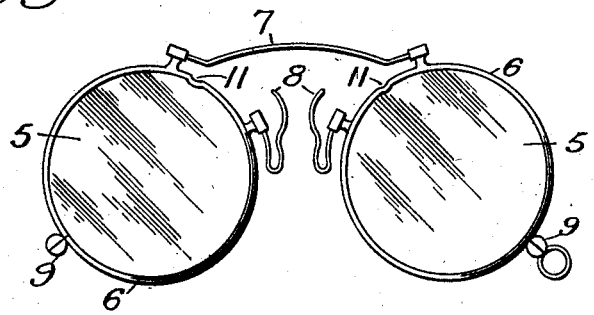
Figure 1 is a front view of a pair of eye glasses showing the improvements applied thereto.
Figure 2:
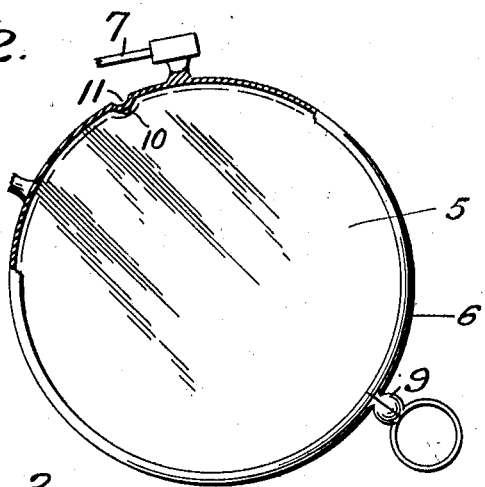
Fig. 2 is an enlarged view of one of the lenses with its frame partly in section.

Where oval lenses are used in eye glass frames, they are retained in their places against rotation by the correspondingly shaped frames but with the use of the circular eye wire it is difficult to provide sufficient clamping strength to retain the lens from rotation.

The lenses shown in the drawings are of any type and grade of circular glasses 5 and fitted within the groove around the inner surface of the frame 6. The frames are united by the bridge or spring 7 and have the nose grips 8, of the eye glasses but it is obvious that the improvements may be applied to the ordinary spectacle.

The frames 6, are united after the lenses are inserted by means of the usual screws in the studs or ends 9, but it is rarely the case that sufficient delicacy of construction is attained to rigidly clamp the lens in place.

In order to prevent any movement of the lens, a notch 10, is filed or otherwise cut in its edge adjacent the frame and in the latter a depression or indent 11, is swaged to fit in the notch and prevent movement by practically locking the frame and lens together.

This invention provides a very simple and cheap means for overcoming the above described difficulty but it is obvious that the notch and indent may be located at any desired point or otherwise modified without departing from the essential features above described or from the scope of the appended claims.

Figure 3:
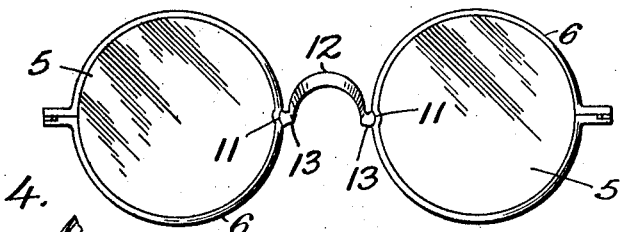
Fig. 3 shows the invention as applied to spectacles.
Figure 4:
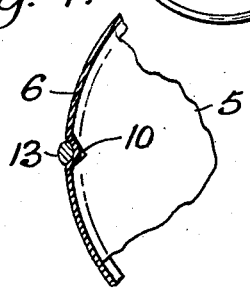
Fig. 4 is a fragmentary detail of the latter.

The construction of spectacles affords a means for concealing the indent as shown in Figs. 3 and 4 and the notch 10, is made as usual in the glass 5, and the indent 11, swaged in the frame. The spectacles have usual bridge 12 with horizontal shanks 13, whose ends are fitted in the indents and welded or soldered therein and not only making a neater joint, but hiding or disguising the indent.

In celluloid or composition frames the indent or a bur may be formed during the manufacture of the same or it may be formed by heating and softening the frame.

What I claim as new is:—

1. In eye glasses and spectacles, the combination of a frame adapted to fit about the edges of a lens that has a notch adjacent the said frames, an indent swaged from outside the frame and engaging the notch, and means from parts of the eye glass or spectacle for filling the recess on the outside of the frame after the indent is made.

2. In eye glasses and spectacles, the combination of a lens having a notch in its edge, a frame to carry the lens and having an indent swaged therein to cause the frame to engage the notch, and a bridge having a shank adapted to fit in the indent and be secured to the frame.

In testimony whereof I have signed my name to this specification in the presence of a subscribing witness, this 24th day of January, 1920.

FREDERICK G. BURGESS.

Witness:
CHARLES C. BRUCKNER.